United States Patent
Sarkar et al.

(10) Patent No.: US 10,042,849 B2
(45) Date of Patent: Aug. 7, 2018

(54) SIMPLIFYING INVOCATION OF IMPORT PROCEDURES TO TRANSFER DATA FROM DATA SOURCES TO DATA TARGETS

(71) Applicant: Oracle Financial Services Software Limited, Mumbai (IN)

(72) Inventors: Subrata Sarkar, Bangalore (IN); Aditya Gadgil, Bangalore (IN)

(73) Assignee: ORACLE FINANCIAL SERVICES SOFTWARE LIMITED, Mumbai (IN)

( * ) Notice: Subject to any disclaimer, the term of this patent is extended or adjusted under 35 U.S.C. 154(b) by 597 days.

(21) Appl. No.: 14/633,158

(22) Filed: Feb. 27, 2015

(65) Prior Publication Data

US 2016/0085764 A1    Mar. 24, 2016

(30) Foreign Application Priority Data

Sep. 22, 2014   (IN) .......................... 4619/CHE/2014

(51) Int. Cl.
    *G06F 17/30*      (2006.01)

(52) U.S. Cl.
    CPC .. *G06F 17/30079* (2013.01); *G06F 17/30174* (2013.01); *G06F 17/30563* (2013.01)

(58) Field of Classification Search
    CPC ................................................ G06F 17/30079
    USPC ........................................................ 707/610
    See application file for complete search history.

(56) References Cited

U.S. PATENT DOCUMENTS

| | | |
|---|---|---|
| 6,263,427 B1 | 7/2001 | Cummins et al. |
| 6,718,332 B1 * | 4/2004 | Sitaraman ......... G06F 17/30569 |
| 7,164,422 B1 | 1/2007 | Wholey, III et al. |
| 7,793,084 B1 | 9/2010 | Mimar |

(Continued)

FOREIGN PATENT DOCUMENTS

WO      2013147879 A1    10/2013

OTHER PUBLICATIONS

Po-Yung Chang, Hao E, Tse-Yu Yeh, Patt Y, Abstract, Branch classification: a new mechanism for improving branch predictor performance, Microarchitecture, 1994. MICRO-27. Proceedings of the 27th Annual International Symposium on, ISSN : 1072-4451, Date of Conference: Nov. 30-Dec. 2, 1994, pp. 22-31, Publisher: IEEE.

(Continued)

*Primary Examiner* — Rehana Perveen
*Assistant Examiner* — Hicham Skhoun
(74) *Attorney, Agent, or Firm* — IPHorizons PLLC; Narendra Reddy Thappeta

(57) ABSTRACT

An aspect of the present disclosure facilitates transferring data from multiple data sources to desired data targets. In one embodiment, meta-data specifying multiple use cases is maintained, with each use case indicating an import procedure and a corresponding condition to be satisfied by a set of import parameters such that the import procedure is executed for importing of data upon satisfaction of the corresponding condition. In response to receiving an import connector requesting transfer of data from data sources to data targets, a use case is selected having the condition which is satisfied by the respective values for the corresponding import parameters received in the import connector. The execution of the import procedure indicated by the (Continued)

selected use case is then initiated to import data from the data sources to the data targets.

17 Claims, 12 Drawing Sheets

(56) References Cited

U.S. PATENT DOCUMENTS

| | | |
|---|---|---|
| 8,533,698 B2 | 9/2013 | Zhu et al. |
| 2005/0225778 A1* | 10/2005 | Izumi ................ G06F 17/30569 358/1.1 |
| 2008/0147698 A1 | 6/2008 | Gustafsson et al. |
| 2009/0019431 A1 | 1/2009 | George et al. |
| 2009/0193039 A1* | 7/2009 | Bradley ............ G06F 17/30539 |
| 2011/0004621 A1* | 1/2011 | Kelley ................ G06Q 10/06 707/769 |
| 2011/0078424 A1 | 3/2011 | Boehm et al. |
| 2011/0214110 A1 | 9/2011 | Baron et al. |
| 2014/0156711 A1* | 6/2014 | Sharan .............. G06F 17/30294 707/804 |
| 2016/0063880 A1* | 3/2016 | Maipady .................. G09B 7/00 434/350 |

OTHER PUBLICATIONS

ISR Search Report, Co-pending PCT International application No. PCT/IB2015/055818 (filing date:Jul. 31, 2015), dated Oct. 21, 2015, pp. 1-3.

Written Opinion of the International Searching Authority, Co-pending PCT International application No. PCT/IB2015/055818 (filing date:Jul. 31, 2015), dated Oct. 21, 2015, pp. 1-8.

* cited by examiner

| | USE_CASE_ID 411 | PARAM_CODE 412 | PARAM_TYPE 413 | PARAM_DESC 414 | PARAM_VALUE 415 | PARAM_STYPE 416 | |
|---|---|---|---|---|---|---|---|
| 441 → | 1 | ISFILE | – | | Y | | ... |
| 442 → | 1 | ISRECTYPE | – | | N | | ... |
| 443 → | 1 | COLNOTFILT | – | | N | | ... |
| 444 → | 1 | LOADMTHD | – | | 1 | | ... |
| 445 → | 1 | HASEXPR | – | | N | | ... |
| 446 → | 1 | MRTHAN1SDI | – | | N | | ... |
| 447 → | 1 | ISMULTARG | – | | N | | ... |
| 448 → | 1 | SETOPT | O | | RECORD_DELIM_EXIST | IKM | ... |
| 449 → | 1 | SETOPT | O | | SRC_FILTER | IKM | ... |
| 450 → | 1 | SETOPT | O | | LOA_DISCARDMAX | IKM | ... |
| 451 → | 1 | SETOPT | O | | FILES_NAME | IKM | ... |
| 452 → | 1 | LKMX | O | | | | ... |
| 453 → | 1 | LKMF | O | | | | ... |
| 454 → | 1 | LKMO | O | | | | ... |
| 455 → | 1 | IKM | O | | 14 | | ... |
| 456 → | 1 | LKME | O | | | | ... |
| 457 → | 1 | STAGASTARG | O | | N | | ... |
| 458 → | 1 | CKM | – | | 1 | | ... |
| 459 → | 2 | HASEXPR | – | | N | | ... |
| 460 → | 2 | ISMULTARG | – | | N | | ... |
| 461 → | 2 | MRTHAN1SDI | – | | N | | ... |
| 462 → | 2 | COLNOTFILT | – | | Y | | ... |
| 463 → | 2 | ISEBCDIC | – | | 1 | | ... |
| 464 → | 2 | LOADMTHD | – | | | | ... |
| 465 → | 2 | SETOPT | O | | FILES_NAME | IKM | ... |
| 466 → | 2 | SETOPT | O | | SRC_FILTER | IKM | ... |
| 467 → | 2 | SETOPT | O | | RECEORD_DELIM_EXIST | IKM | ... |
| 468 → | 2 | LKMX | O | | | | ... |
| 469 → | 2 | LKMF | O | | | | ... |
| 470 → | 2 | LKMO | O | | | | ... |
| 471 → | 2 | CKM | O | | 1 | | ... |
| 472 → | 2 | LKME | O | | | | ... |
| 473 → | 2 | STAGASTARG | O | | N | | ... |
| 474 → | 2 | IKM | O | | 13 | | ... |
| 475 → | 3 | ISMULTARG | – | | N | | ... |

| | | PARAM_TEXT | TECHNOLOGY |
|---|---|---|---|
| 441 | ... | select CASE WHEN sdeb type = 'D' THEN 'Y' ELSE 'N' END from fsi_connector_b conb,fsi_datasets dsets, fsi_sub_data... | ORADB |
| 442 | ... | select 'Y' from dual where exists (select 1 from fsi_connector_b conb,fsi_datasets dsets, fsi_col colwhere conb... | ODI |
| 443 | ... | select CASE WHEN 'Y' IN(ind_filcol_us_map, ind_filcol_notequal) THEN 'Y' ELSE 'N' END from fsi_connector_b conb... | ORADB |
| 444 | ... | select VAL_ID from fsi_cont_options_map conb where (CONB) AND conb.option_id=1 | ODI |
| 445 | ... | select decode(count(1),0,'N','Y') from fsi_cont_mapping conb, fsi_expression exp where conb.src_exp_id=exp.ex... | ORADB |
| 446 | ... | select decode(count(1),1,'N','Y') from fsi_connector_b conb, fsi_datasets dset, fsi_sub_data_entity_b sdeb WHE... | ORADB |
| 447 | ... | select CASE WHEN count(1) > 1 THEN 'Y' ELSE 'N' END from fsi_cont_stval_map conb where (CONB) | ORADB |
| 448 | ... | Select CASE WHEN sdeb.rec_sep = 'N' else 'Y' end from fsi_connector_b conb, fsi_datasets dsets, fsi_sub_d... | ODI |
| 449 | ... | Select exp.expression from fsi_connetctor_b conb, fsi_datasets dsets, fsi_sub_data_entity_b sdeb, fsi_data_entity_... | ODI |
| 450 | ... | select text_val from fsi_cont_options_map conb where (CONB) AND conb.option_id = 6 | ODI |
| 451 | ... | select listagg(dsb.dt_file.loc || fil.file_pattern, ',') within group(order by fil.pattern_seq) from fsi_... | ODI |
| 452 | ... | | |
| 453 | ... | | |
| 454 | ... | | |
| 455 | ... | | |
| 456 | ... | | |
| 457 | ... | | |
| 458 | ... | | ODI |
| 459 | ... | select decode(count(1),0,'N','Y') from fsi_cont_mapping conb, fsi_expression exp where conb.src_exp_id=exp.ex... | ORADB |
| 460 | ... | select CASE WHEN count(1) > 1 THEN 'Y' ELSE 'N' END from fsi_cont_stval_map conb where (CONB) | ORADB |
| 461 | ... | select decode(count(1), 1,'N','Y') from fsi_connector_b conb, fsi_datasets dset, fsi_sub_data_entity_b sdeb WHE... | ORADB |
| 462 | ... | select CASE WHEN 'Y' IN(ind_filcol_us_map, ind_filcol_notequal) THEN 'Y' ELSE 'N' END from fsi_connector_b conb... | ORADB |
| 463 | ... | select CASE WHEN sdeb type = 'E' THEN 'Y' ELSE 'N' END from fsi_connector_b conb, fsi_datasets dsets, fsi_sub_... | ORADB |
| 464 | ... | select VAL_ID from fsi_cont_options_map conb where (CON) AND conb.option_id=1 | ODI |
| 465 | ... | select listagg(dsb.dt_file.loc || fil.file_pattern, ',') within group(order by fil.pattern_seq) from fsi_... | ODI |
| 466 | ... | Select exp.expression from fsi_connectctor_b conb, fsi_datasets dsets, fsi_sub_data_entity_b sdeb, fsi_data_entity_... | ODI |
| 467 | ... | select CASE WHEN sdeb.rec_sep = 'N' else 'Y' end from fsi_connector_b conb, fsi_datasets dsets, fsi_sub_d... | ODI |
| 468 | ... | | ODI |
| 469 | ... | | ODI |
| 470 | ... | | ODI |
| 471 | ... | | |
| 472 | ... | | |
| 473 | ... | | ODI |
| 474 | ... | | |
| 475 | ... | select CASE WHEN count(1) > 1 THEN 'Y' ELSE 'N' END from fsi_cont_stval_map conb where (CONB) | ORADB |

Browser – Source Data Interface Specification

Source Details

| | |
|---|---|
| Source Code | OFSS220680_F |
| Source Description | ASCII files location from source system |

Source Data Interface Specification Details

| | |
|---|---|
| Name | TD_CASA_FILE_1 |
| Description | Term deposits and Casa in one delimited file. It has only few... |

540

| Source Data | Control |
|---|---|

| | |
|---|---|
| File Name | Comb_tdcasaPsplit1.csv |
| File Format | Delimited |
| Column Delimiter | Comma |
| Skip number of Records | 1 |

| | |
|---|---|
| Record Delimiter | Unix |
| Text Qualifier | |
| Decimal Separator | |

Source Data Elements 1 to 6 of 6  << < > >>

| Order | Name | Type | Length | Precision | Format | Record type Code |
|---|---|---|---|---|---|---|
| 1 | Account_Number | STRING | 50 | 0 | | |
| 2 | FIC_MIS_DATE | DATE | 0 | 0 | MM/DD/YYYY | |
| 3 | V_CHANNEL_CODE | STRING | 50 | 0 | | |
| 4 | V_CUST_REF_CODE | STRING | 50 | 0 | | |
| 5 | V_ACCT_STATUS | STRING | 50 | 0 | | |
| 6 | V_INTEREST_METHOD | STRING | 50 | 0 | | |

545

( Unpublish )  ( Close )

Audit Trail | Comments
Audit Trail

FIG. 5B

Browser – Connectors (Definition Mode) — 500

Connectors

| Applications | Funds Transfer Pricing ▼ |
| --- | --- |
| OFSAA Data Interface | Customer Account ▼ |

Connector Details | Connector Properties

| Loading Mechanism | ○ External Table  ● SQLLDR | DIRECT | ▼ | Parallel | True ▼ |
| --- | --- | --- | --- | --- | --- |
| DOP | 5 | No. of Errors | 0 | Maximum Discard | 1 |
| ODI FOLDER | IUT-1 | XML Data Format | YYYY-MM-DD | File | |

Map to SDI

Joins

| SDI | Source ID | Source Name | Source Type | Filter Expression |
| --- | --- | --- | --- | --- |
| TD_CASA_FILE_1 | OFSS22680_F | ASCII files location from source system | File | ✎ |
| TD_CASA_FILE_2 | OFSS22680_F | ASCII files location from source system | File | ✎ |

Map to SDI Fields | Subtype Discriminator Mapping

| Source Field | Logical Attribute Name | Expression |
| --- | --- | --- |
| Account_Number | Account/Contact Code* | |
| FIC_MIS_DATE | Extraction Date* | |
| V_CHANNEL_CODE | Channel Code | |
| V_CUST_REF_CODE | Customer Code | |

590 — (Submit) (Save) (Close) — 580

Audit Trail | Comments
⌃ Audit Trail

*FIG. 5F*

SIMPLIFYING INVOCATION OF IMPORT PROCEDURES TO TRANSFER DATA FROM DATA SOURCES TO DATA TARGETS

PRIORITY CLAIM

The instant patent application is related to and claims priority from the co-pending provisional India patent application entitled, "CODING TECHNIQUE USING A DECISION TREE IN DATA IMPORTING", Serial No.: 4619/CHE/2014, Filed: 22 Sep. 2014, which is incorporated in its entirety herewith to the extent not inconsistent with the disclosure herein.

BACKGROUND

Technical Field

The present disclosure relates to data storage and management, and more specifically to simplifying invocation of import procedures to transfer data from data sources to data targets.

Related Art

There is often a need to transfer data from data sources to data targets. Transferring often entails processing of the data to convert it into suitable format and then storing the data in the corresponding data target. Such processing is commonly termed as ETL (extract, transform and load).

Import procedures are often implemented for providing specific processing functions as a part of the requisite transfer. For example, an import procedure may be designed for specific combinations of data sources and data targets. In general, a corresponding import procedure is required to be invoked for effecting a desired transfer, with the invocation potentially requiring additional supporting actions (such as setting some of the configuration options of the import procedure).

Aspects of the present disclosure simplify invocation of such import procedures for transferring data, particularly in complex environments.

BRIEF DESCRIPTION OF THE DRAWINGS

Example embodiments of the present disclosure are described with reference to the accompanying drawings briefly described below.

FIGS. 4A and 4B together depicts the manner in which meta-data specifying use cases (control repository 360) is maintained in one embodiment.

FIG. 5B illustrates the manner in which an administrator specifies the format of a text file used as a data source in one embodiment.

FIG. 5F illustrates the manner in which an import connector is received in one embodiment.

In the drawings, like reference numbers generally indicate identical, functionally similar, and/or structurally similar elements. The drawing in which an element first appears is indicated by the leftmost digit(s) in the corresponding reference number.

DESCRIPTION OF EXAMPLE EMBODIMENTS

1. Overview

An aspect of the present disclosure facilitates transferring data from multiple data sources to desired data targets. In one embodiment, meta-data specifying multiple use cases is maintained, with each use case indicating an import procedure and a corresponding condition to be satisfied by a set of import parameters such that the import procedure is executed for importing of data upon satisfaction of the corresponding condition.

In response to receiving an import connector requesting transfer of data from data sources to data targets, a use case is selected having the condition which is satisfied by the respective values for the corresponding import parameters received in the import connector. Execution of the import procedure indicated by the selected use case, is then initiated to import data from the data sources to the data targets.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Example Environment

Figure 1:
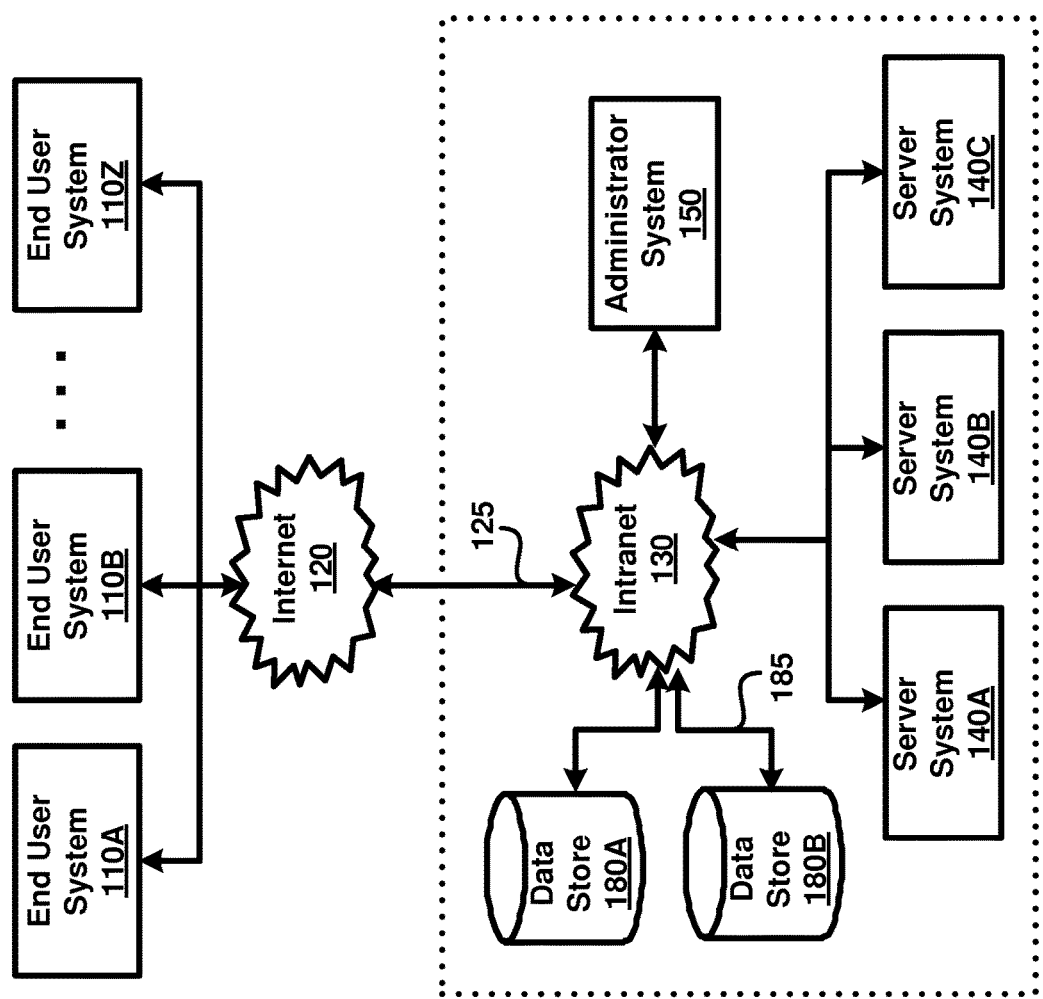
FIG. 1 is a block diagram illustrating an example environment (computing system) in which several aspects of the present disclosure can be implemented.

FIG. 1 is a block diagram illustrating an example environment (computing system) in which several aspects of the present disclosure can be implemented. The block diagram is shown containing end user systems 110A-110Z, Internet 120, intranet 130, server systems 140A-140C, administrator system 150, and data stores 180A-180B.

Merely for illustration, only representative number/type of systems is shown in the Figure. Many environments often contain many more systems, both in number and type, depending on the purpose for which the environment is designed. Each system/device of FIG. 1 is described below in further detail.

Intranet 130 represents a network providing connectivity between server systems 140A-140C, administrator system 150 and data stores 180A-180B all provided within an enterprise (shown with dotted boundaries). Internet 120 extends the connectivity of these (and other systems of the enterprise) with external systems such as end user systems 110A-110Z. Each of intranet 140 and Internet 120 may be implemented using protocols such as Transmission Control Protocol (TCP) and/or Internet Protocol (IP), well known in the relevant arts. In general, in TCP/IP environments, an IP packet is used as a basic unit of transport, with the source address being set to the IP address assigned to the source system from which the packet originates and the destination address set to the IP address of the destination system to which the packet is to be eventually delivered.

An IP packet is said to be directed to a destination system when the destination IP address of the packet is set to the IP address of the destination system, such that the packet is eventually delivered to the destination system by networks 120 and 130. When the packet contains content such as port numbers, which specifies the destination application, the packet may be said to be directed to such application as well. The destination system may be required to keep the corresponding port numbers available/open, and process the packets with the corresponding destination ports. Each of Internet 120 and intranet 130 may be implemented using any combination of wire-based or wireless mediums.

Each of data stores 180A-180B represents a non-volatile (persistent) storage facilitating storage and retrieval of a collection of data by enterprise applications (such as financial applications, analytical frameworks, etc.) executing in other systems of the enterprise such as server systems 140A-140C and administrator system 150. Some of data stores 180A-180B may be implemented as a database server using relational database technologies and accordingly provide storage and retrieval of data using structured queries such as Structured Query Language (SQL). Other data stores may be implemented as a file server providing storage and retrieval of data in the form of files organized as one or more directories, as is well known in the relevant arts.

Each of end user systems 110A-110Z represents a system such as a personal computer, workstation, mobile station, mobile phones, computing tablets, etc., used by users to generate and send user requests directed to specific systems of the enterprise. The user requests may be generated using appropriate user interfaces (for example, web pages provided by applications executing in the enterprise). For example, the users may send user requests for performing various tasks to enterprise applications executing in server systems 140A-140C, and receive corresponding responses containing the results of performance of the requested tasks.

Each of server systems 140A-140C represents a server, such as a web/application server, executing enterprise applications capable of performing tasks requested by users using end user systems 110A-110Z. In response to receiving requests from end user systems, each server system performs the tasks specified in the requests and sends the result of performance of the tasks to the requesting end user system. Each server system may use data stored internally (for example, in a non-volatile storage/hard disk within the server), external data (e g, maintained in data stores 180A-180B) and/or data received from external sources (e.g., from the user) in performing such tasks.

Thus, the data used by the enterprise applications may be maintained in different systems such as server systems 140A-140c and data stores 180A-180B within the enterprise. The data may be maintained/stored in different formats, for example, as files, databases (in data stores 180A-180B), legacy systems, distributed data, etc. Accordingly, there may be a need to transfer data from one system storing the data ("data source") to another system ("data target"). It should be noted that such transfer may involve one or more intermediate/additional steps such as changing the format of the data, filtering the source data, performing computations on the source data to generate target data, deleting the transferred data from the data source after successful transfer (commonly referred to as moving the data), etc.

As noted in the Background section, the transfer of data is typically effected by using one or more import procedures. In complex environments having different number of data sources and data targets, the number of import procedures may be large (in the range of 100+), with each import procedure requiring corresponding configuration options to be set during invocation. An administrator is accordingly required for each transfer, to identify a suitable import procedure, determine the appropriate values for the configuration options of the identified import procedure and thereafter invoke the identified import procedure with the determined values. Such a task may be laborious and time consuming for the administrator, in particular, when a large number of transfers are to be performed.

Administrator system 150, provided according to several aspects of the present disclosure, simplifies the invocation of import procedure to transfer data from data sources to data targets, as described below with examples.

3. Simplifying Invocation of Import Procedures

Figure 2:
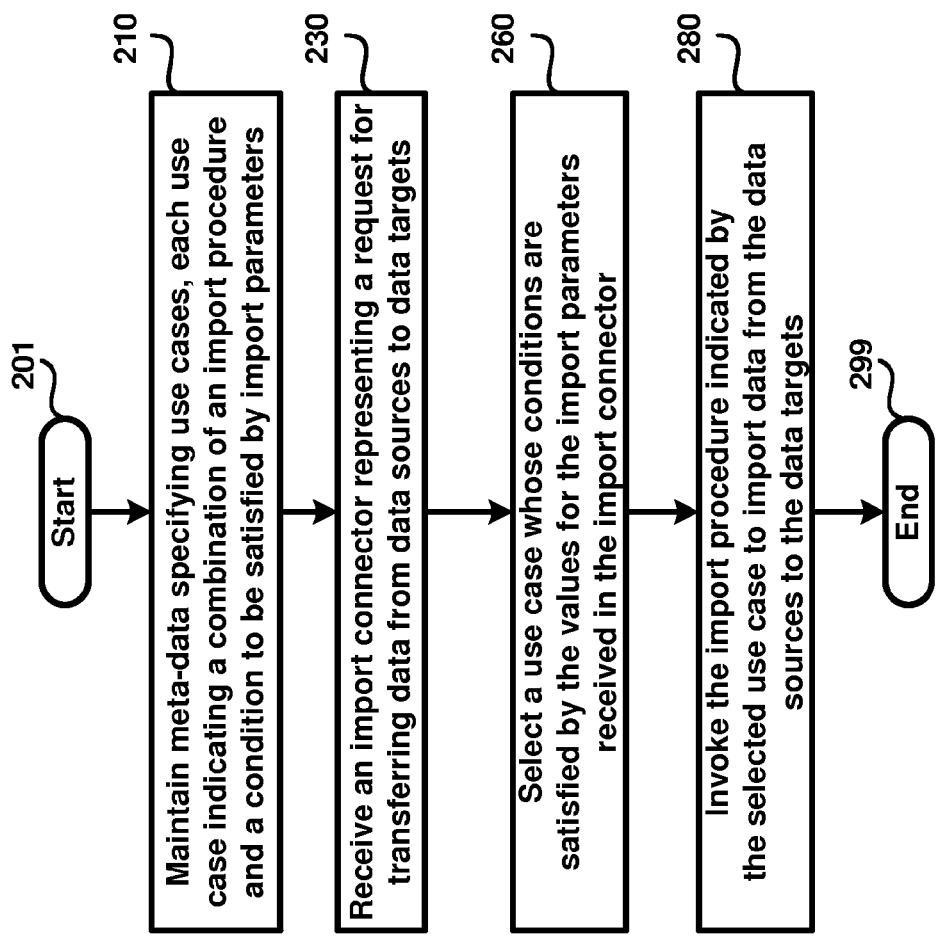
FIG. 2 is a flow chart illustrating the manner in which invocation of import procedures (to transfer data from data sources to data targets) is simplified according to an aspect of the present disclosure.

FIG. 2 is a flow chart illustrating the manner in which invocation of import procedures (to transfer data from data sources to data targets) is simplified according to an aspect of the present disclosure. The flowchart is described with respect to FIG. 1, in particular, administrator system 150 merely for illustration. However, many of the features can be implemented in other environments (and using potentially other types of systems/servers) also without departing from the scope and spirit of several aspects of the present disclosure, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present disclosure. The flow chart begins in step 201, in which control immediately passes to step 210.

In step 210, administrator system 150 maintains meta-data specifying use cases, each use case indicating a combination of an import procedure and a condition to be satisfied by import parameters. As may be readily appreciated, meta-data refers to data which is maintained external to software/program instructions, and provided as input to the instructions during execution. The condition is typically in the form of a logical expression constructed based on the import parameters.

In step 230, administrator system 150 receives an import connector, representing a request for transferring data from data sources to data targets. The import connector also specifies values for import parameters.

In step 260, administrator system 150 selects a use case whose conditions are satisfied by the values for the import parameters received in the import connector. A condition is deemed to be satisfied if the values of the import parameters, when applied against the condition, evaluate the corresponding logical expression to a pre-specified logical value (e.g., true).

In step 280, administrator system 150 invokes (i.e., initiates execution of) the import procedure indicated by the selected use case to import data from the data sources to the data targets according to the import connector. The use case may also specify any (support) actions to be performed prior or post invocation, and accordingly such actions may also be performed in addition to the invocation. The flow chart ends in step 299.

Thus, by enabling a user/administrator to specify use cases capturing different transfer scenarios (in step 210), the selection and invocation of import procedures for performing (a large number of) transfers (in step 230-280) is simplified. The features described above can be implemented in various embodiments. The description is continued with respect to an example implementation for transferring of data in a corresponding environment.

4. Example Implementation

Figure 3:
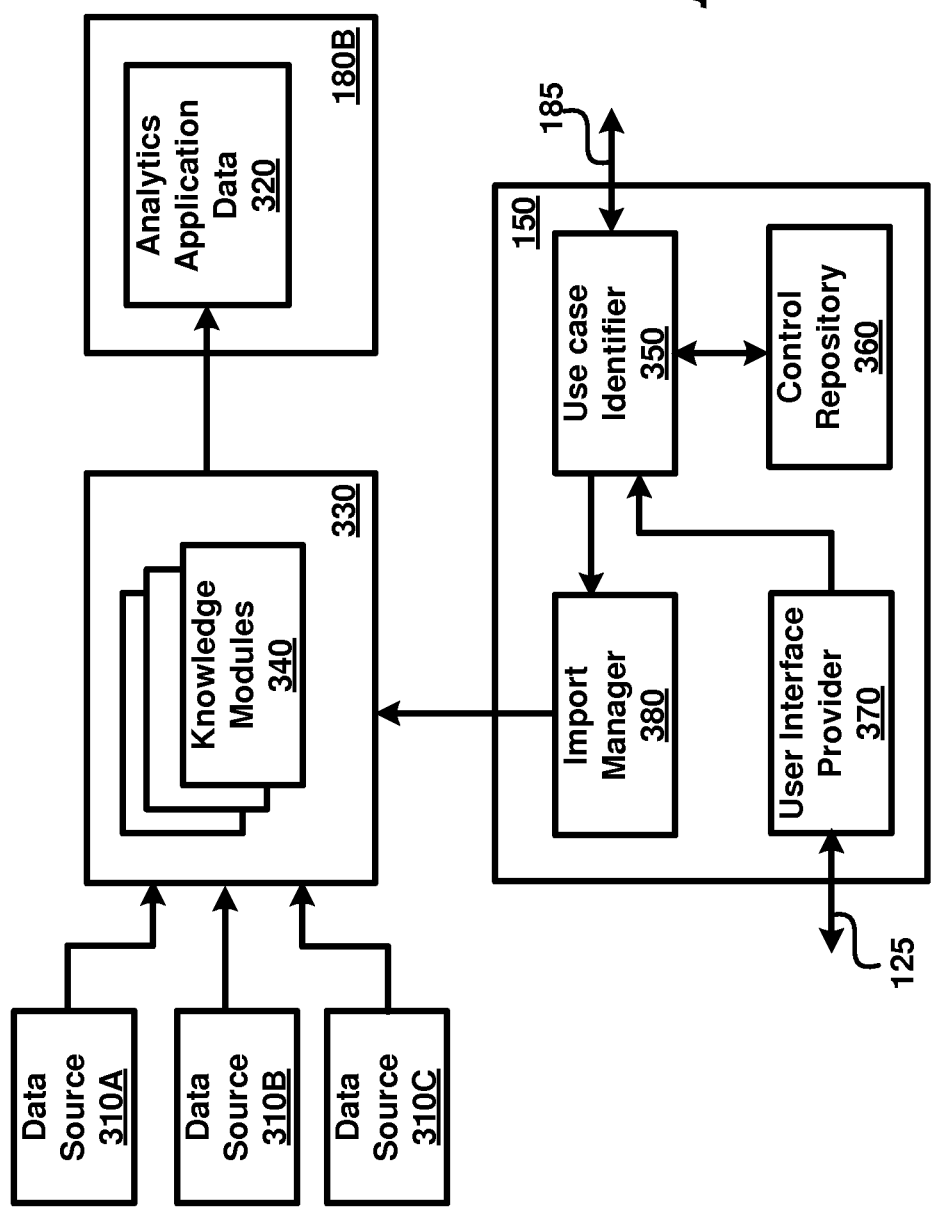
FIG. 3 is a block diagram illustrating the manner in which invocation of import procedures is simplified in one embodiment.

FIG. 3 is a block diagram illustrating the manner in which invocation of import procedures is simplified in one embodiment. The block diagram is shown containing data sources 310A-310C, analytics application data (AAD) 320, data integrator 330, knowledge modules 340 (executing in data integrator 330), use case identifier 350, control repository 360, user interface provider 370 and import manager 380 (with blocks 350, 360, 370 and 380 shown executing in administrator system 150). Each of the blocks is described in detail below.

Each of data sources 310A-310C represents a corresponding system within the enterprise (such as server systems 140A-140C or data stores 180A-180B) that stores/has the data sought to be transferred. As noted above, each data source may be one of one or more text files, one or more Extensible Markup Language (XML) files, tables in a database, one or more distributed data nodes (such as maintained by Hadoo™ available from Apache Corporation), etc.

Analytics application data (AAD) 320 represents one or more tables in a database in data store 180B (assumed to be implemented as a relational database server), and is used by an analytics application (not shown) for processing user requests. In one embodiment, AAD 320 is modeled (and accordingly accessed by the analytics application) as objects. For example, the data in one or more tables may be modeled as an object, with the respective columns of such table(s) modeled as a corresponding attribute of the object. Each row in the table(s) may then be modeled as an instance ("object instance") of the object, with the respective attributes having the corresponding values stored in the row.

The analytics application is a business intelligence application executing in one of server systems 140A-140C that generally enables financial enterprises to measure and meet risk-adjusted performance objectives, to cultivate a risk management culture, lower the costs of compliance and regulation, and improve customer insights. Oracle Financial Services Analytical Application (OFSAA) available from Oracle Corporation is an example of such an analytics application.

It may be appreciated that for the operation of the analytics application, data from various data sources (such as 310A-310C) may be required to be imported into AAD 320 (with AAD or some of the tables in AAD being the data targets). Such importing may entail converting the data from the format in the data sources to one or more object instances that can be stored as part of the data targets in AAD 320.

Data integrator 330 represents a system/application (executing in one of server systems 140A-140C) that facilitates the importing of data from different data sources (such as 310A-310C) into AAD 320. Data integrator 330 covers various data integration requirements such as performing high-volume, high-performance batch loads to event-driven, trickle-feed integration processes, to service-oriented architecture (SOA) enabled data services. In one embodiment, data integrator is used to import/load data into staging tables (not shown) within data store 180B, which is thereafter incorporated into AAD 320. Oracle Data Integrator (ODI) available from Oracle Corporation is an example of such a data integrator application.

In one embodiment, data integrator 330 provides various knowledge modules 340 for performing the importing of data from different data sources. Different knowledge modules are provided based on at least some of but not restricted to the data source technology (files vs tables vs distributed data), the number of records/objects to be imported, the specific data joins to be performed, whether filters are used on the data sources (to filter the data imported), the number of data sources, the number of data targets (tables in AAD 320). Each knowledge module contains import procedures which when executed performs the importing of the data from the desired data sources into AAD 320. For convenience, in the disclosure herein, it is assumed that each knowledge module corresponds to a single import procedure, with some of knowledge modules 340 designed to be operative based on the values of one or more configuration options.

As noted above, several aspects of the present disclosure simplify the invocation of the import procedures (knowledge modules 340) based on a meta-data maintained by administrator system 150. The manner in which such meta-data may be maintained is described below with examples.

5. Maintaining Meta-Data

Control repository 360 represents a meta-data indicating various use cases maintained by administrator system 150. Though shown within administrator system 150, in alternative embodiments, control repository 360 may be provided in an external system such as data stores 180A-180B, as will be apparent to one skilled in the relevant arts by reading the disclosure herein. A sample control repository/meta-data that may be maintained is described below with examples.

FIGS. 4A and 4B together depicts the manner in which meta-data specifying use cases (control repository 360) is maintained in one embodiment. For convenience, the meta-data is shown maintained in the form of a table, though in alternative embodiments, the meta-data may be maintained using other data structures (such as arrays, trees, etc.) and/or in other formats (such as Extensible Markup Language (XML)) as will be apparent to one skilled in the relevant arts by reading the disclosure herein.

Table 400 depicts a portion of control repository 360. Column 411 ("USE_CASE_ID") indicates an identifier of a use case. Multiple rows can have the same identifier to indicate that the use case is defined in corresponding rows in table 400. In general, each row associated with a use case specifies the details of a corresponding parameter (either import/input parameter or an output parameter) of the use case.

Column 412 ("PARAM_CODE") indicates a code of a parameter specified as part of a use case. Each code is an alphanumeric value that can be either a Key parameter (implying a corresponding action) or a Non-Key parameter (implying that it is an import parameter). Example of the Non-Key parameter codes are ISFILE (in row 441) for checking whether the source is a file and ISRECTYPE (in row 442) for checking whether the source uses a record type column, while an example of a Key parameter code is SETOPT for indicating setting an output option for the import procedure.

Column 413 ("PARAM_TYPE") specifies a type of the corresponding parameter, with the value "I" in this column indicating that row specifies an input parameter and the value "O" in this column indicating that the row specifies an output parameter. Column 414 ("PARAM_DESC") specifies a description of the corresponding parameter. Column 415 ("PARAM_VALUE") indicates a value of the corresponding parameter. In the scenario that the parameter is a logical choice (such as ISFILE, etc.), the value may be one of "Y" (indicating "Yes") and "N" (indicating "No"). When the parameter is for setting an output option (SETOPT), the value may indicate the specific name of the option (such as SRC_FILTER, FILES_NAME, etc.) to be set. Column 416 ("PARAM_STYPE") indicates a sub-type of the corresponding parameter, in particular of the type of the parameter value when the parameter code is SETOPT.

Column 417 ("PARAM_TEXT") specifies a program logic/an executable script to be executed for retrieving the actual value of the parameter. For example, when the parameter is ISFILE, the executable script may be executed to determine whether the data source is a file type. In one embodiment shown here, the program logic is in the form of a SELECT query according to Structured Query Language (SQL). Column 418 ("TECHNOLOGY") specifies the technology to be used when executing the executable script specified in column 416. The value "ORADB" in this column indicates that SQL query is to be executed on an external database, while the value "ODI" indicates that the SQL query is to be executed on the database maintained by data integrator 330.

Each of rows 441-474 specifies the details of a corresponding parameter. It may be observed that the parameters in rows 441-458 correspond to a first use case (with identifier 1, as indicated in column 411), while parameters in rows 459-474 correspond to a second use case (with identifier 2, as indicated in column 411). For illustration, the rows corresponding to the first use case (for handling transfer of data from ASCII (American Standard Code for Information Interchange) encoded files) is described in detail below.

It may be appreciated that the value (I/input or O/output) in column 413 may be used to group the rows/parameters into input rows 441-447 and output rows 448-458. Each of the input rows 441-447 specifies the code of a Non-Key/import parameter and a corresponding value that is to be matched. In particular, rows 441-447 respectively checks whether the data being imported is a file (ISFILE), contains a record type (ISRECTYPE), has all the columns which are mapped as not filtered (COLNOTFILT), the specific load method selected (LOADMTHD), has expressions (HASEXPR), has more than one data sources (MRTHAN1SDI), and has more than one targets (ISMULTARG). Since all the input rows are required to be matched, the condition for the first use case as specified by rows 441-447 is the logical expression ((ISFILE="Y") AND (ISRECTYPE="N") AND (COLNOTFILT="N") AND (LOADMTHD="1") AND (HASEXPR="N") AND (MRTHAN1SDI="N") AND (ISMULTARG="N")) formed based on the input/import parameters.

Output rows 448-458 specify the details of the outputs to be generated for the first use cases. In particular, row 455 (IKM) specifies the identifier (14) of the integration knowledge module to be used for transferring the data. Rows 452-454 and 456 also specify other types of loading knowledge modules that can be used for the transfer, though in this use case, the blank value in column 415 for these rows indicates that such modules are not required for this specific transfer scenario. Row 458 (CKM) specifies the identifier (1) of the check knowledge module to be used for transferring the data.

Output rows 448-451 specify Key output parameter SETOPT, indicating that the output rows specify configuration options to be set during invocation of the knowledge module. The identifier of the configuration option (such as RECORD_DELIM_EXIST, SRC_FILTER) is specified in column 415, while the specific knowledge module for which these options are to be set is indicated in column 416 (the value "IKM" there indicating that all the options are for the IKM specified in row 455). It should be noted that the values of the configuration options are available in an external/internal database (as indicated by column 418), and accordingly a respective program logic/SQL query for retrieving the values is specified in column 417. Output row 457 specifies the details of an option to be set on the import procedure. In this case, it indicates whether the target is to be used as a staging area.

Thus, rows 441-458 together provide the details of a first use case by specifying the input and output parameters of the use case. Similarly, rows 459-474 provide the details of a second use case, in particular, for handling transfer of data from Extended Binary Coded Decimal Interchange Code (EBCDIC) files. Other use cases specific to other transfer scenarios may be similarly specified. It should be noted that only a sample list of input/output parameters and use cases is shown in table 400 for illustration, and in actual embodiments, the number/type of parameters and user cases may be large (100+) as suitable to the environment in which the features of the present disclosure are sought to be implemented.

Referring again to FIG. 3, control repository 360 maintains the meta-data shown in table 400 for processing transfer requests. The meta-data may be installed as part of setup of administrator system 150, with an administrator later adding/modifying (using appropriate user interfaces, not shown) use cases based on the transfer requests desired to be handled.

In one embodiment, the transfer requests are received in the form of import connectors which specify the data sources, the data targets and other details of the transfer. The manner in which import connectors/transfer requests may be received is described below with examples.

6. Receiving Import Connectors

User interface (UI) provider (block) 370 facilitates users to generate and send/submit import connectors to administrator system 150 by providing appropriate user interfaces. In the following description it is assumed that the user interfaces are provided on an administrator system 150, though in alternative embodiments, the user interfaces may be provided on one of end user systems 110A-110Z or server system 140A-140C, as will be apparent to one skilled in the relevant arts by reading the disclosure herein. Some sample user interfaces that may be provided by UI provider 370 is described in detail below.

FIGS. 5A-5E depicts sample user interfaces that may be provided for facilitating the specification and submission of import connectors in one embodiment. Display area 500 of each Figure depicts a portion of a user interface provided on a display unit (not shown in FIG. 1) associated with administrator system 150. In one embodiment, each display area corresponds to a browser displaying respective web pages provided by administrator system 150 (in particular, UI provider 370). The web pages are provided in response to an administrator of the enterprise sending appropriate requests (for example, by specifying URLs) using the browser in administrator system 150.

Figure 5A:
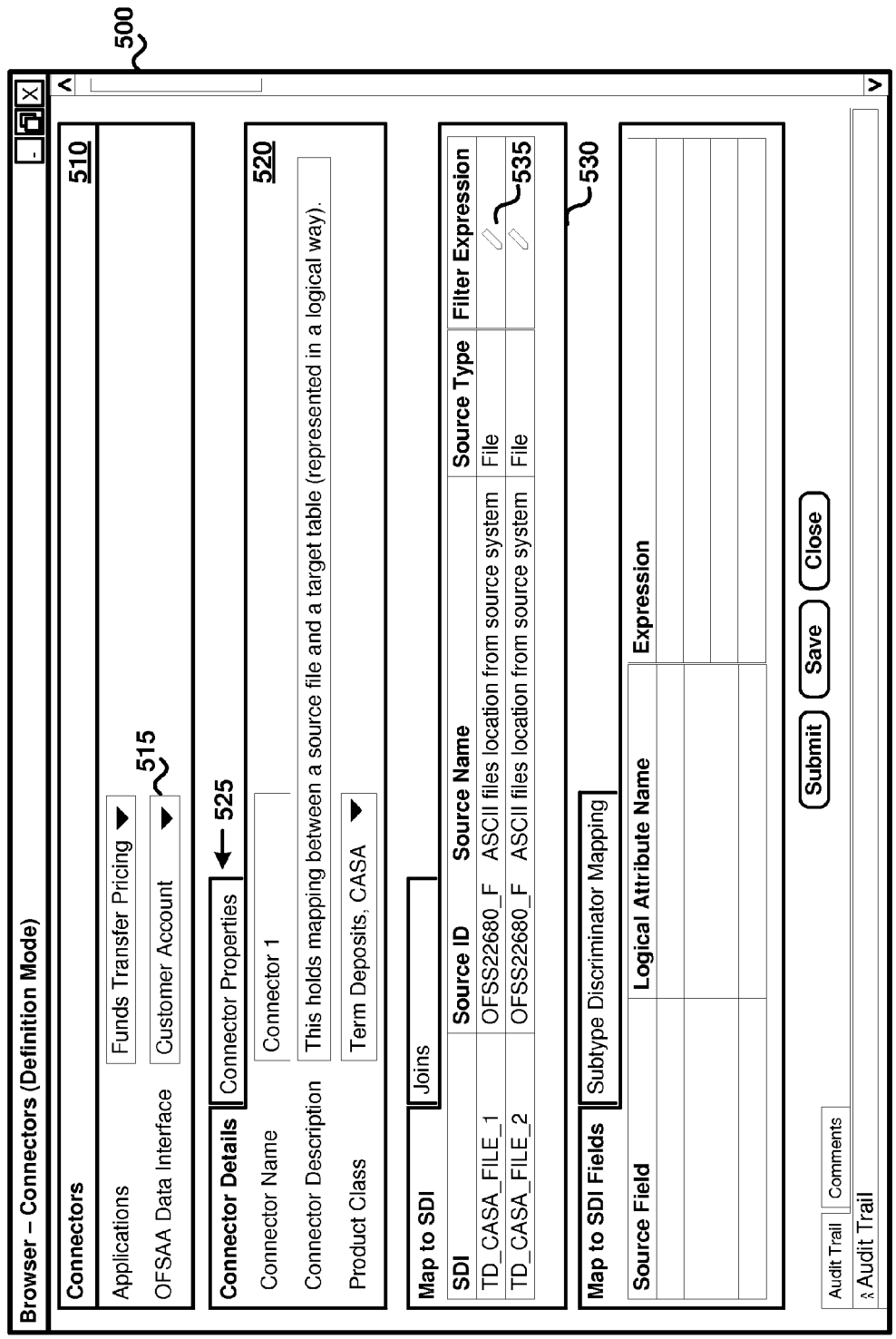
FIG. 5A illustrates the manner in which an administrator specifies data sources and data targets as part of an import connector in one embodiment.

FIG. 5A illustrates the manner in which an administrator specifies data sources and data targets as part of an import connector in one embodiment. Display area 510 enables the administrator to select a data target for the import of the data, in particular, the specific data interface (Customer Account as indicated in display area 515) of AAD 320. Display area 520 enables the administrator to specify general details of the import connector such as a name ("Connector1"), description and a product class ("Term Deposits, CASA") to which the connector belongs.

Display area 530 enables the administrator to add data sources (corresponding to 310A-310C) to be used for the import/transfer. Display area 530 indicates that the administrator has selected two text files ("TD_CASA_FILE_1" and "TD_CASA_FILE_2") as the data sources. The administrator may also specify the format of the text files (to facilitate importing of the data) as described in detail below FIG. 5B illustrates the manner in which an administrator specifies the format of a text file used as a data source in one embodiment. Display area 540 indicates that the format of the text file "TD_CASA_FILE_1" is being specified. Display area 545 indicates the name of the actual file storing the data ("Comb_tdcasaPsplit1.csv"), the delimiter to be used for determining each record (the text "Unix" indicating that the delimiter is the end of line character in Unix systems), and the delimiter to be used for determining fields/columns (comma) Display area 545 further specifies (under "Source Data Elements") the details (such as data type, length, format, etc.) of the fields/columns that are present in the text file.

Thus, an administrator is facilitated to specify the format of a text file used as a data source for the transfer. It should be appreciated, that interfaces similar to FIG. 5B may be used for specifying the formats of other text based data sources such as Extensible Markup Language (XML) files, as will be apparent to one skilled in the relevant arts by reading the disclosure herein. The administrator may also specify various expressions for filtering the records to be imported as described in detail below.

Figure 5C:
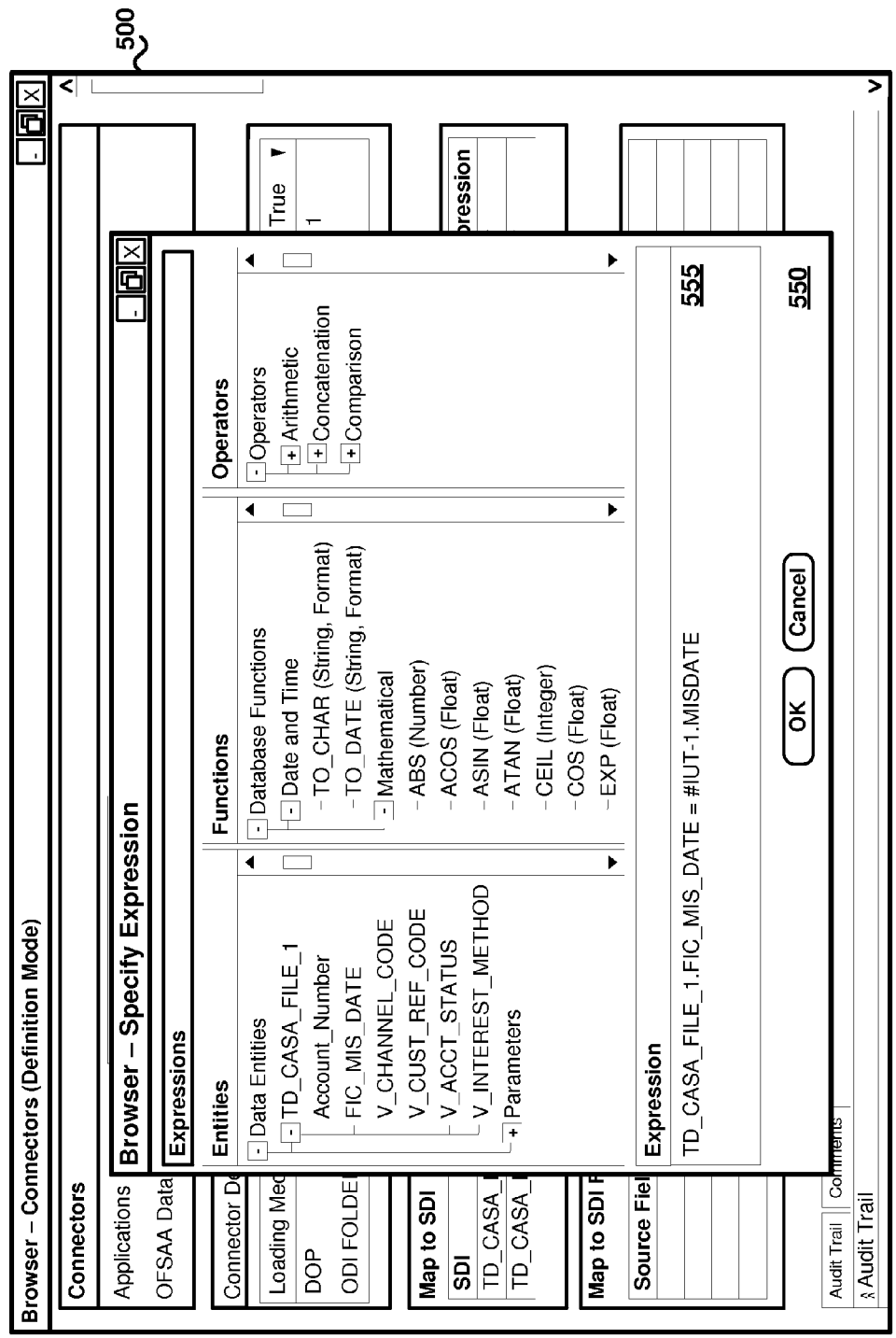
FIG. 5C illustrates the manner in which an administrator specifies expressions for filtering the records to be imported from a data source in one embodiment.

FIG. 5C illustrates the manner in which an administrator specifies expressions for filtering the records to be imported from a data source in one embodiment. Display area 550 is a pop-up window that is displayed in response to a user/administrator selecting the expression icon 535 in display area 530 of FIG. 5A. Display area 550 provides a list of the entities (including the fields defined by the administrator in display area 545), a list of available database functions and a list of operators. The administrator may accordingly pick/select a combination of entities, functions and operators to create the desired expression, for example, the expression shown in display area 555.

In response to the administrator selecting the "OK" button, the specified expression (such as "TD_CASA_FILE_1.FIC_MIS_DATE=#IUT-1.MIS-DATE" shown in display area 555) is used as the basis for filtering the records that are imported. In particular, only the records that match the specific expression are imported from the specific data source ("TD_CASA_FILE_1") into the data target (Customer Account in AAD 320).

Figure 5D:
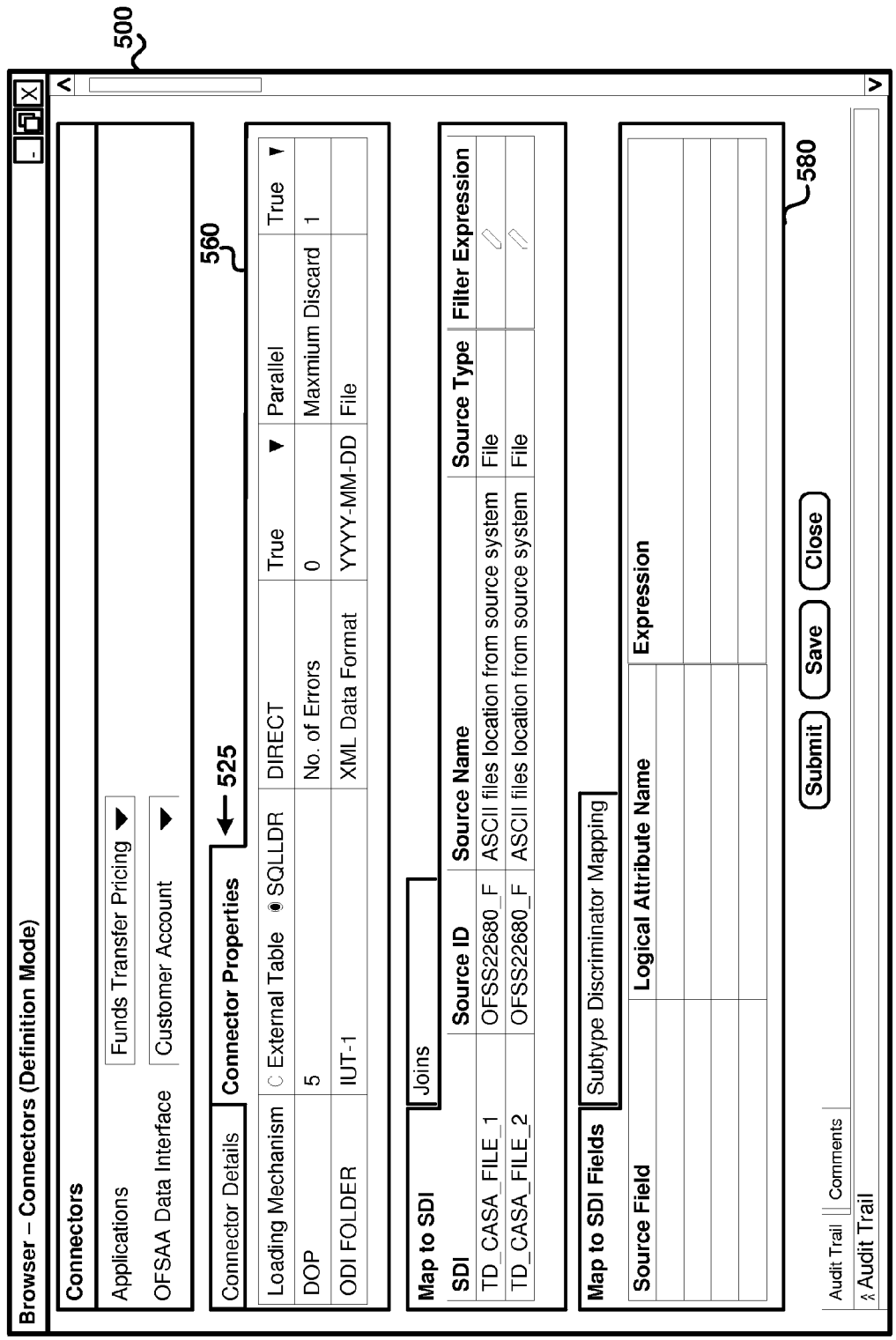
FIG. 5D illustrates the manner in which an administrator specifies values for import parameters as part of an import connector in one embodiment.

FIG. 5D illustrates the manner in which an administrator specifies values for import parameters as part of an import connector in one embodiment. Display area 560 is displayed in response to a user/administrator selecting the "Connector Properties" tab in display area 525. Display area 560 facilitates the administrator to select a loading mechanism (here indicated to be SQL Loader), whether the loading/importing of the data is to be done directly to the data target (as indicated by the selected value "True") or through staging tables (value "False"), whether the loading is to be done in parallel (as indicated by the selected value "True") or sequentially, and the values of other import parameters. Though not shown, other import parameters may also be provided, with the administrator then specifying desired values for the provided import parameters as part of the import connector.

Figure 5E:
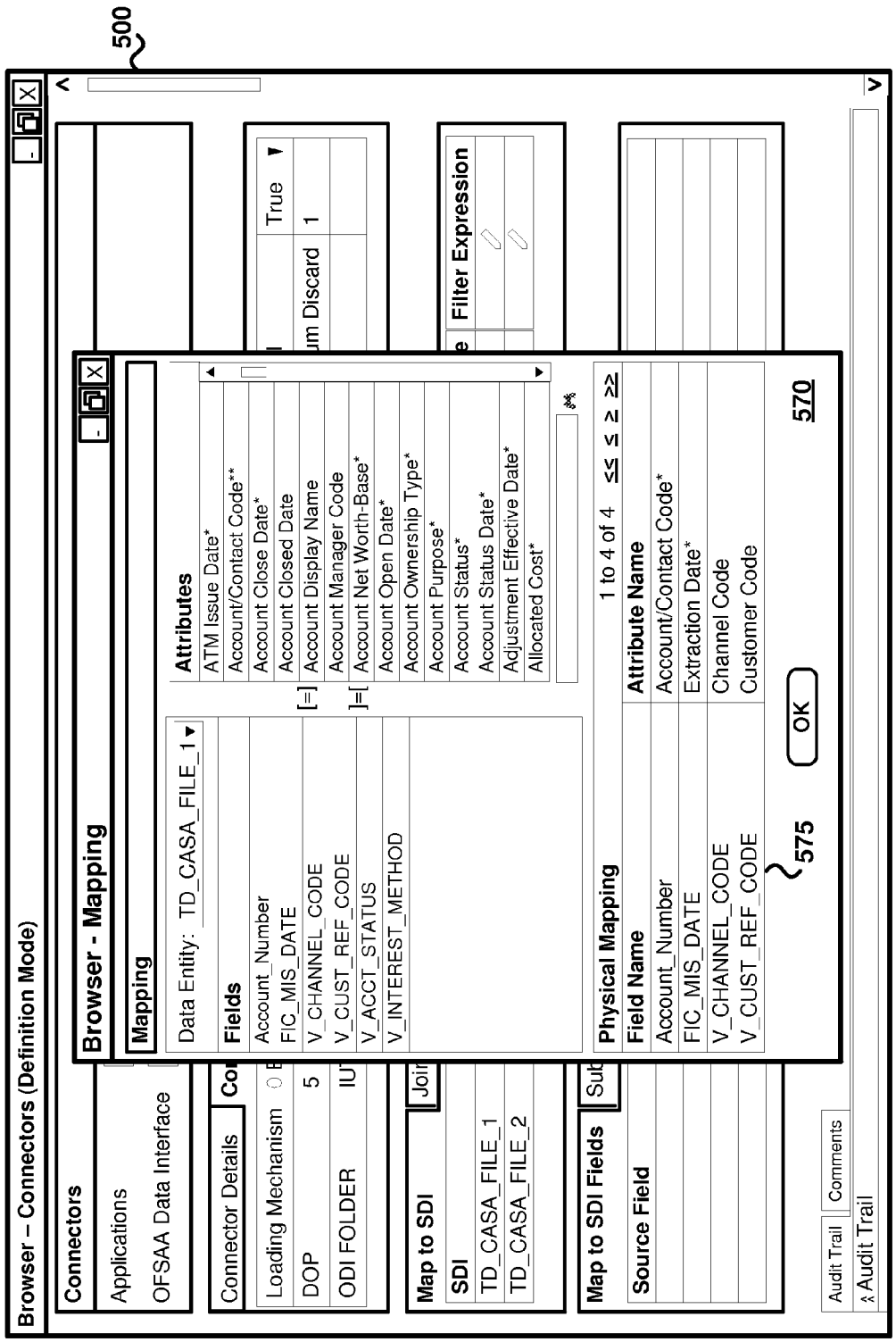
FIG. 5E illustrates the manner in which an administrator specifies a mapping between fields in a data source to attributes in a data target in one embodiment.

FIG. 5E illustrates the manner in which an administrator specifies a mapping between fields in a data source to attributes in a data target in one embodiment. Display area 550 is a pop-up window that is displayed in response to a user/administrator selecting/clicking display area 580 of FIG. 5D. Alternatively, display area 570 may be displayed in response to the user/administrator selecting a button (not shown) and/or pressing a pre-defined set of keys on a keyboard.

Display area 570 provides a list of fields in a data source/entity selected by the administrator (here, the fields in "TD_CASA_FILE_1" as specified by the administrator in display area 545 of FIG. 5B) and also a list of attributes defined for the data target object "Customer Account" in AAD 320. The administrator may select a desired field in the "Fields" list, a desired attribute in the "Attributes" list and then click/select the "=" icon to form a mapping between the selected field and attribute. The list of such mappings specified by the administrator is shown in display area 575.

FIG. 5F illustrates the manner in which an import connector is received in one embodiment. Display area 580 indicates the mapping specified by the administrator using the pop-up window of display area 570. It may be appreciated that the user interfaces of FIG. 5A-5E may be used by the administrator to specify various details of the import connector. After the desired details are specified, the administrator may select "Submit" button 590 to indicate that the import connector is to be submitted for processing.

Referring again to FIG. 3, UI provider 370, in response to the user selection of button 590, creates a new import connector using the information specified/received in the user interfaces of FIGS. 5A-5F. The new import connectors specifies the details of the data sources ("TD_CASA_FILE_1" and "TD_CASA_FILE_2"), the data targets (Customer Account), any expressions to be used for filtering the records to be imported from the data sources (such as "TD_CASA_FILE_1.FIC_MIS_DATE=#IUT-1.MIS-DATE"), the values of various import parameters (as shown in display area 560), and the physical mapping between the fields in the data sources and the attributes in the data targets (such as the mapping shown in display area 575/580). Some of the values specified in the import connector may be stored in pre-defined locations (columns/tables) of internal/external databases, such that the execution of program logics/SQL queries thereafter causes these values to be returned for the import parameters.

UI provider 370 then forwards the import connector to use case identifier (block) 350 for processing. The manner in which an import connector is processed and import procedures invoked for effecting the import of data from data sources to data targets is described below with examples.

7. Invoking Import Procedures

Use case identifier 350 receives the details of an import connector (such as the connector defined using the interfaces of FIG. 5A-5F) from UI provider 370 and then identifies a use case (stored in control repository 360) having the condition which is satisfied by the respective values for the corresponding import parameters received in the import connector. As noted above, conditions specified in the use cases are in the form of corresponding logical expressions constructed based on the import parameters.

As such, use case identifier 350 retrieves the details of each use case from control repository 360 and then applies the values of the import parameters against the condition specified in each use case. A condition is deemed to be satisfied if the corresponding logical expression (when applied with the values of the import parameters received in the import connector) evaluates to a pre-specified logical value (e.g., true). The use case whose condition is satisfied is identified/selected by use case identifier 350.

In the embodiment where the control repository 360 maintains the use cases in the form of table 400 (of FIGS. 4A/4B), use case identifier 360 first retrieves the rows/parameters corresponding to each use case (such as rows 441-458 corresponding to the first use case and rows 459-474 corresponding to the second use case). A use case is deemed to match the import connector (transfer scenario) when the values for all the input parameters specified for the use case matches the corresponding values received in the import connector. In other words, a use case is selected only when the values of the import parameters when applied to the logical expression specified by the input parameters in the use case (such as ((ISFILE="Y") AND (ISRECTYPE="N") AND (COLNOTFILT="N") AND (LOADMTHD="1") AND (HASEXPR="N") AND (MRTHAN1SDI="N") AND (ISMULTARG="N")) for the first use case) evaluates the logical expression to a pre-specified logical value (e.g., true).

Use case identifier 360 accordingly first performs the program logic/SQL queries shown in column 417 to retrieve the values of the input parameters and then compares the retrieved values to the values specified for the input parameters in a retrieved use case. If the values do not match (indicating that the import connector is not a match to the chosen use case), use case identifier 360 selects another use case (for example, with identifier 2 in table 400) from the use cases specified in control repository 360. Use case identifier 360 performs the above noted actions of choosing a use case, running the operations as specified by the chosen use case, obtaining the results of the operations, and comparing the obtained results with the values specified in the use case iteratively until a matching use case is found.

In the scenario that a matching use case is found, use case identifier 360 determines the values of the output parameters indicated in the matching use case (by inspecting column 415 in table 400 and/or by executing the program logic specified in column 417). Use case identifier 360 then forwards the details of the output to import manager (block) 380 such as the specific ones of knowledge modules 340 to be executed, the configuration options to be set for each of the specific knowledge modules, the filters/expressions to be set for importing from each data source, etc.

Import manager 380, in response to receiving the above noted data from use case identifier 360 invokes (initiates execution of) the specific ones of knowledge modules 340 using the configuration options and filters specified for each of the specific knowledge modules/data sources. In one embodiment, import manager 380 selects the specific knowledge modules/import procedures, sets the configuration options of the selected modules and creates a data flow scenario in data integrator 330. Upon execution of the data flow (which in turn causes execution of the specific knowledge modules/import procedures) in data integrator 330, data is imported from data sources ("TD_CASA_FILE_1" and "TD_CASA_FILE_2") to data targets (Customer Account in AAD 320) according to the values specified (using the interfaces of FIGS. 5A-5F) in the import connector.

Thus, by specifying various use cases capturing different transfer scenarios (table 400), the selection and invocation of import procedures (knowledge modules 340) for performing transfer of data from data sources (310A-310C) to data targets (AAD 320) is simplified.

It should be appreciated that the features described above can be implemented in various embodiments as a desired combination of one or more of hardware, executable modules, and firmware. The description is continued with respect to an embodiment in which various features are operative when the instructions in the executable modules are executed.

8. Digital Processing System

Figure 6:
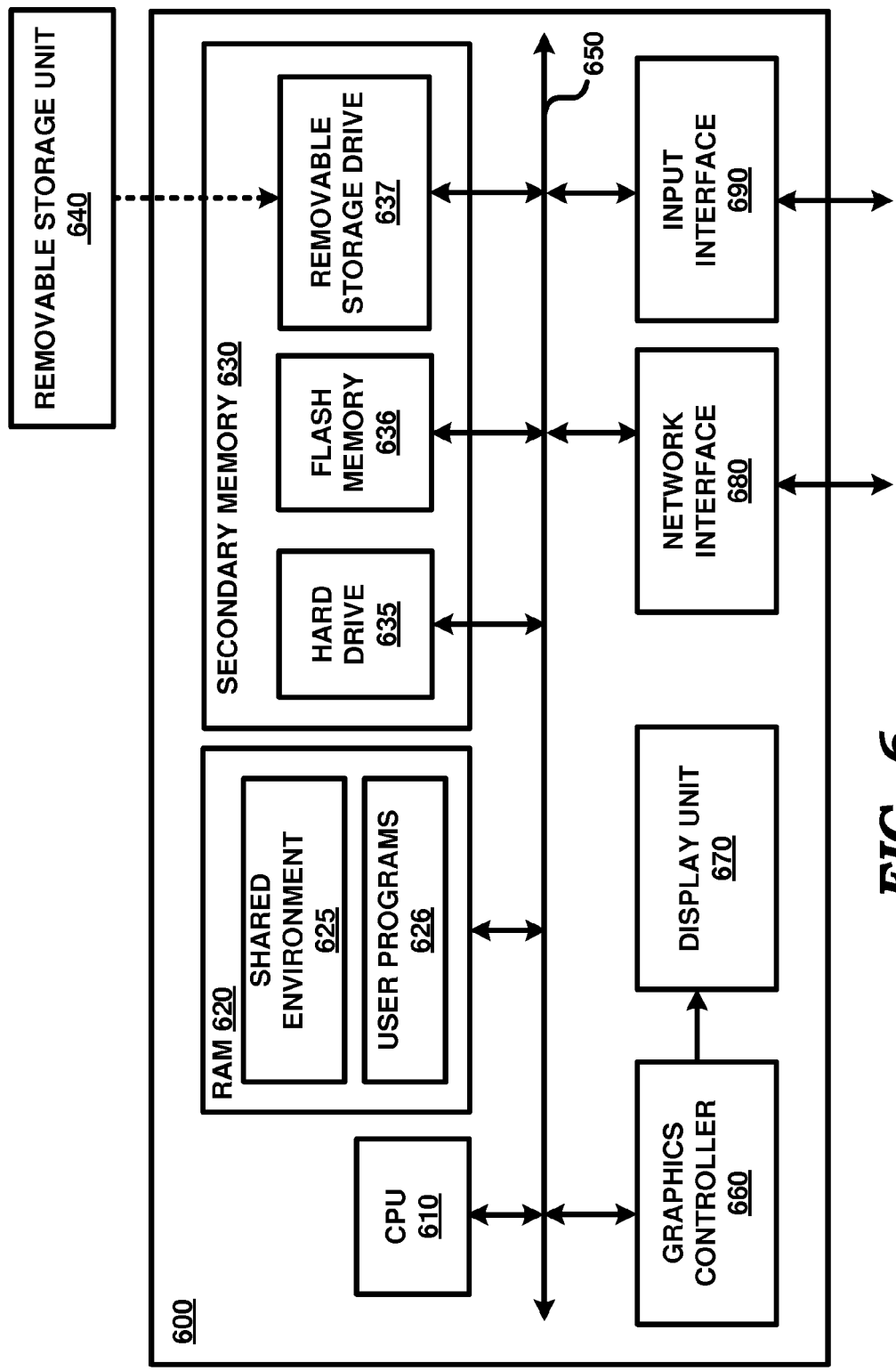
FIG. 6 is a block diagram illustrating the details of a digital processing system in which several aspects of the present disclosure are operative by execution of appropriate software instructions.

FIG. 6 is a block diagram illustrating the details of digital processing system 600 in which several aspects of the present disclosure are operative by execution of appropriate software instructions. Digital processing system 600 corresponds to administrator system 150 or other systems (e.g., end user systems 110A-110Z) from which various features described above can be provided.

Digital processing system 600 may contain one or more processors (such as a central processing unit (CPU) 610), random access memory (RAM) 620, secondary memory 630, graphics controller 660, display unit 670, network interface 680, and input interface 690. All the components except display unit 670 may communicate with each other over communication path 650, which may contain several buses as is well known in the relevant arts. The components of FIG. 6 are described below in further detail.

CPU 610 may execute instructions stored in RAM 620 to provide several features of the present disclosure. CPU 610 may contain multiple processing units, with each processing unit potentially being designed for a specific task. Alternatively, CPU 610 may contain only a single general-purpose processing unit. RAM 620 may receive instructions from secondary memory 630 using communication path 650.

RAM 620 is shown currently containing software instructions constituting shared environment 625 and/or user programs 626 (such as financial applications, analytical framework, etc.). Shared environment 625 contains utilities shared by user programs, and such shared utilities include operating system, device drivers, virtual machines, flow engines, etc., which provide a (common) run time environment for execution of user programs.

Graphics controller 660 generates display signals (e.g., in RGB format) to display unit 670 based on data/instructions received from CPU 610. Display unit 670 contains a display screen to display the images defined by the display signals (such as the portions of the user interface of FIGS. 5A-5F). Input interface 690 may correspond to a keyboard and a pointing device (e.g., touch-pad, mouse) that may be used to provide various inputs (such as to specify the desired inputs, etc. in the user interfaces of FIGS. 5A-5F). Network interface 680 provides connectivity to a network (e.g., using Internet Protocol), and may be used to communicate with other connected systems (such as server systems 140A-140C, data stores 180A-180B).

Secondary memory 630 represents a non-transitory medium, which may store the data (for example, portions of data shown in FIGS. 4A/4B) and software instructions (for example, for performing the steps of FIG. 2), to enable digital processing system 600 to provide several features in accordance with the present disclosure. The code/instructions stored in secondary memory 630 may either be copied to RAM 620 prior to execution by CPU 610 for higher execution speeds, or may be directly executed by CPU 610.

Secondary memory 630 may contain hard drive 635, flash memory 636, and removable storage drive 637. Some or all of the data and instructions may be provided on removable storage unit 640, and the data and instructions may be read and provided by removable storage drive 637 to CPU 610. Removable storage unit 640 may be implemented using medium and storage format compatible with removable storage drive 637 such that removable storage drive 637 can read the data and instructions. Thus, removable storage unit 640 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 640 or hard disk installed in hard drive 635. These computer program products are means for providing software to digital processing system 600. CPU 610 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 630. Volatile media includes dynamic memory, such as RAM 620. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 650. Transmission media can also take the form of acoustic or light waves, such as those generated during radio-wave and infra-red data communications.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

9. Conclusion

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

Further, the purpose of the following Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present disclosure in any way.

What is claimed is:

1. A method of transferring data from multiple data sources to data targets, said method comprising:
   maintaining meta-data specifying a plurality of use cases, each use case containing data to indicate an import procedure and a corresponding condition to be satisfied by a set of import parameters, wherein said import procedure is to be executed for importing of data upon satisfaction of said corresponding condition, wherein said meta-data is maintained in the form of a table containing rows and columns, each use case being represented as a corresponding plurality of rows in said table, wherein a first column of said table indicates whether each of the rows specifies an input of the use case or an output of the use case such that the plurality of rows comprises a set of input rows and a set of output rows,
   wherein the set of input rows specifies the corresponding condition for the use case, each input row indicating a corresponding import parameter and a respective value, wherein said selecting selects said first use case when the respective value specified for the corresponding import parameter matches the value received in said import connector for all of said set of input rows;
   receiving an import connector requesting transfer of data from a first set of data sources to a first set of data targets, said import connector specifying respective values for a plurality of import parameters;
   selecting a first use case of said plurality of use cases having the condition which is satisfied by the respective values for the corresponding import parameters received in said import connector; and
   initiating execution of a first import procedure indicated by said first use case to import data from said first set of data sources to said first set of data targets, wherein a first output row of the set of output rows indicates the import procedure for the use case.

2. The method of claim 1, wherein said receiving, said selecting and said initiating are implemented as a software program external to the import procedures, such that modifications or additions to data sources, data targets and import parameters can be effected by changing only said meta-data.

3. The method claim 2, wherein said first import procedure is designed to operate based on a first configuration option,
   wherein said first use case in said meta-data further specifies a first value for said first configuration option, wherein said initiating initiates execution of said first import procedure with said first configuration option set to said first value.

4. The method of claim 3, wherein a first set of import parameters specified in said first use case contains:
   a first import parameter indicating a storage technology according to which data sources are to be implemented for said first use case to be selected;
   a second import parameter indicating a number of data sources to be present in a corresponding import connector for the first use case to be selected;
   a third import parameter indicating a number of data targets to be present in a corresponding import connector for the first use case to be selected; and
   a fourth import parameter indicating a number of records to be imported from the data sources for the first use case to be selected.

5. The method of claim 1, wherein some of the set of output rows indicate a corresponding configuration option of the import procedure and respective value to be set during invocation of the import procedure.

6. The method of claim 1, further comprising in response to said receiving, storing the respective values for said plurality of import parameters received in said import connector in a database,
   wherein each of the set of input rows specifies, in a second column of said table, a corresponding program logic designed to retrieve the value for the corresponding import parameter from said database,
   wherein said selecting comprises executing the program logics specified in the set of input rows to retrieve the values for the import parameters and to determine whether the condition specified in the use case is satisfied by the retrieved values.

7. A non-transitory machine readable medium storing one or more sequences of instructions for enabling a system to transfer data from multiple data sources to data targets, wherein execution of said one or more instructions by one or more processors contained in said system enables said system to perform the actions of:
   maintaining meta-data specifying a plurality of use cases, each use case containing data to indicate an import procedure and a corresponding condition to be satisfied by a set of import parameters, wherein said import procedure is to be executed for importing of data upon satisfaction of said corresponding condition,
   wherein said meta-data is maintained in the form of a table containing rows and columns, each use case being represented as a corresponding plurality of rows in said table, wherein a first column of said table indicates whether each of the rows specifies an input of the use case or an output of the use case such that the plurality of rows comprises a set of input rows and a set of output rows,
   wherein the set of input rows specifies the corresponding condition for the use case, each input row indicating a corresponding import parameter and a respective value, wherein said selecting selects said first use case when the respective value specified for the corresponding import parameter matches the value received in said import connector for all of said set of input rows;
   receiving an import connector requesting transfer of data from a first set of data sources to a first set of data targets, said import connector specifying respective values for a plurality of import parameters;
   selecting a first use case of said plurality of use cases having the condition which is satisfied by the respective values for the corresponding import parameters received in said import connector; and
   initiating execution of a first import procedure indicated by said first use case to import data from said first set of data sources to said first set of data targets, wherein a first output row of the set of output rows indicates the import procedure for the use case.

8. The non-transitory machine readable medium of claim 7, wherein said receiving, said selecting and said initiating are implemented as a software program external to the import procedures, such that modifications or additions to data sources, data targets and import parameters can be effected by changing only said meta-data.

9. The non-transitory machine readable medium claim 8, wherein said first import procedure is designed to operate based on a first configuration option,
   wherein said first use case in said meta-data further specifies a first value for said first configuration option,
   wherein said initiating initiates execution of said first import procedure with said first configuration option set to said first value.

10. The non-transitory machine readable medium of claim 9, wherein a first set of import parameters specified in said first use case contains:
    a first import parameter indicating a storage technology according to which data sources are to be implemented for said first use case to be selected;
    a second import parameter indicating a number of data sources to be present in a corresponding import connector for the first use case to be selected;
    a third import parameter indicating a number of data targets to be present in a corresponding import connector for the first use case to be selected; and
    a fourth import parameter indicating a number of records to be imported from the data sources for the first use case to be selected.

11. The non-transitory machine readable medium of claim 7, wherein some of the set of output rows indicate a corresponding configuration option of the import procedure and respective value to be set during invocation of the import procedure.

12. The non-transitory machine readable medium of claim 7, further comprising one or more instructions for:
    in response to said receiving, storing the respective values for said plurality of import parameters received in said import connector in a database,
    wherein each of the set of input rows specifies, in a second column of said table, a corresponding program logic designed to retrieve the value for the corresponding import parameter from said database,
    wherein said selecting comprises one or more instructions for executing the program logics specified in the set of input rows to retrieve the values for the import parameters and to determine whether the condition specified in the use case is satisfied by the retrieved values.

13. A computing system comprising:
    a plurality of data sources;
    a plurality of data targets;
    a data integrator system to provide a plurality of import procedures, each import procedure designed to transfer data from said plurality of data sources to said plurality of data targets;
    an administrator system operable to:
      maintain meta-data specifying a plurality of use cases, each use case containing data to indicate an import procedure of said plurality of import procedures and a corresponding condition to be satisfied by a set of import parameters, wherein said import procedure is to be executed for importing of data upon satisfaction of said corresponding condition, wherein said meta-data is maintained in the form of a table containing rows and columns, each use case being represented as a corresponding plurality of rows in said table, wherein a first column of said table indicates whether each of the rows specifies an input of the use case or an output of the use case such that the plurality of rows comprises a set of input rows and a set of output rows, wherein the set of input rows specifies the corresponding condition for the use case, each input row indicating a corresponding import parameter and a respective value, wherein said selecting selects said first use case when the respective value specified for the corresponding import parameter matches the value received in said import connector for all of said set of input rows;

receive an import connector requesting transfer of data from a first set of data sources of said plurality of data sources to a first set of data targets of said plurality of data targets, said import connector specifying respective values for a plurality of import parameters;

select a first use case of said plurality of use cases having the condition which is satisfied by the respective values for the corresponding import parameters received in said import connector; and initiate execution of a first import procedure indicated by said first use case to import data from said first set of data sources to said first set of data targets, said first import procedure being contained in said plurality of import procedures, wherein a first output row of the set of output rows indicates the import procedure for the use case.

14. The computing system of claim 13, wherein said first import procedure is designed to operate based on a first configuration option, wherein said first use case in said meta-data further specifies a first value for said first configuration option, wherein said administrator system initiates execution of said first import procedure with said first configuration option set to said first value.

15. The computing system of claim 14, wherein a first set of import parameters specified in said first use case contains:
   a first import parameter indicating a storage technology according to which data sources are to be implemented for said first use case to be selected;
   a second import parameter indicating a number of data sources to be present in a corresponding import connector for the first use case to be selected;
   a third import parameter indicating a number of data targets to be present in a corresponding import connector for the first use case to be selected; and
   a fourth import parameter indicating a number of records to be imported from the data sources for the first use case to be selected.

16. The computing system of claim 13, wherein some of the set of output rows indicate a corresponding configuration option of the import procedure and respective value to be set during invocation of the import procedure.

17. The computing system of claim 13, said administrator system further operable to:
   in response to receiving said import connector, store the respective values for said plurality of import parameters received in said import connector in a database,
   wherein each of the set of input rows specifies, in a second column of said table, a corresponding program logic designed to retrieve the value for the corresponding import parameter from said database,
   wherein for selecting said first use case, said administrator system is operable to execute the program logics specified in the set of input rows to retrieve the values for the import parameters and to determine whether the condition specified in the use case is satisfied by the retrieved values.

* * * * *